United States Patent
Fuse

(10) Patent No.: US 10,970,093 B2
(45) Date of Patent: Apr. 6, 2021

(54) INFORMATION PROCESSING APPARATUS FOR DISPLAYING A SOFTWARE SCREEN ON A FOREGROUND OF A DISPLAY BASED ON A SETTING

(71) Applicant: CANON KABUSHIKI KAISHA, Tokyo (JP)

(72) Inventor: Hiroshi Fuse, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 15/994,785

(22) Filed: May 31, 2018

(65) Prior Publication Data

US 2018/0373550 A1    Dec. 27, 2018

(30) Foreign Application Priority Data

Jun. 22, 2017  (JP) .............................. JP2017-122437

(51) Int. Cl.
| | |
|---|---|
| G06F 3/048 | (2013.01) |
| G06F 9/451 | (2018.01) |
| G06F 3/0486 | (2013.01) |
| H04L 29/08 | (2006.01) |
| G09G 5/02 | (2006.01) |
| G06F 3/038 | (2013.01) |
| G09G 5/14 | (2006.01) |

(52) U.S. Cl.
CPC .............. *G06F 9/452* (2018.02); *G06F 3/038* (2013.01); *G06F 3/0486* (2013.01); *G06F 9/451* (2018.02); *G09G 5/024* (2013.01); *H04L 67/08* (2013.01); *G06F 2203/0383* (2013.01); *G09G 5/14* (2013.01); *G09G 2354/00* (2013.01)

(58) Field of Classification Search
CPC ... G06F 3/048; G06F 9/44; G06F 9/45; G06F 3/00; G06F 3/041
See application file for complete search history.

(56) References Cited

U.S. PATENT DOCUMENTS

| | | | |
|---|---|---|---|
| 6,212,577 B1* | 4/2001 | Stern ...................... | G06F 9/451 719/329 |
| 2006/0107226 A1 | 5/2006 | Matthews | |
| 2006/0107303 A1* | 5/2006 | Erhart ................... | H04N 7/147 725/135 |
| 2006/0230156 A1 | 10/2006 | Shappir | |
| 2007/0157101 A1 | 7/2007 | Indiran | |
| 2008/0168403 A1* | 7/2008 | Westerman ......... | G06F 3/04883 715/863 |
| 2010/0042945 A1* | 2/2010 | Bauchot ............... | G06F 3/0481 715/772 |
| 2011/0271226 A1 | 11/2011 | Janssen | |
| 2012/0005269 A1* | 1/2012 | Janssen ................ | G06F 3/0481 709/203 |

(Continued)

FOREIGN PATENT DOCUMENTS

JP    2009-540428 A    11/2009

*Primary Examiner* — Hugo Molina
(74) *Attorney, Agent, or Firm* — Canon U.S.A., Inc. IP Division

(57) ABSTRACT

In an apparatus, in a case where a confirming unit confirms that remote desktop connection is made and a software screen is set to be displayed on a foreground, a setting unit cancels the setting for displaying the software screen on the foreground.

15 Claims, 10 Drawing Sheets

(56) References Cited

U.S. PATENT DOCUMENTS

2014/0040862 A1* 2/2014 Webster .................... G06F 8/61
                                                                                  717/121
2014/0293997 A1* 10/2014 Wang ...................... H04L 67/38
                                                                                  370/352
2015/0149329 A1* 5/2015 Tam .................... G06Q 30/0643
                                                                                  705/27.2

* cited by examiner

FIG. 5A1 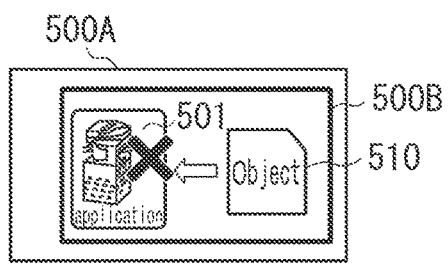
FIG. 5B1 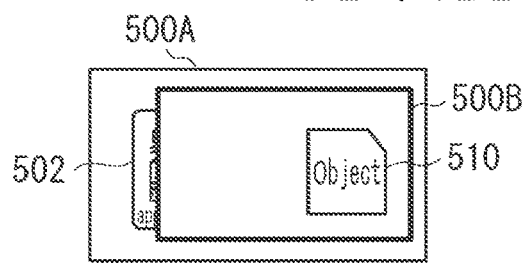
FIG. 5A2 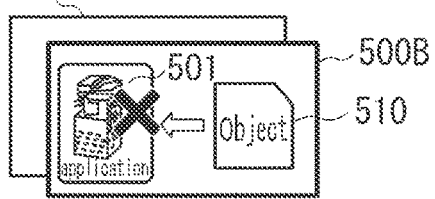
FIG. 5B2 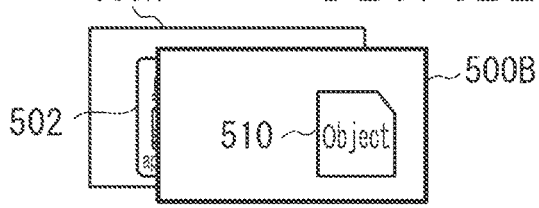
FIG. 5C1 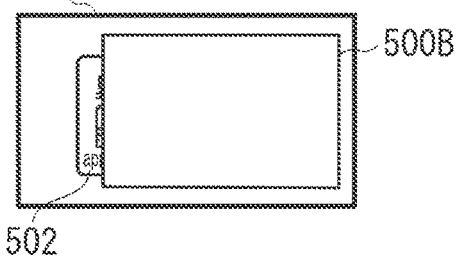
FIG. 5D1 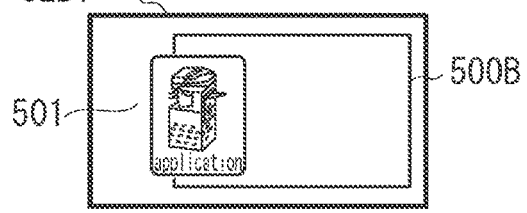
FIG. 5D2 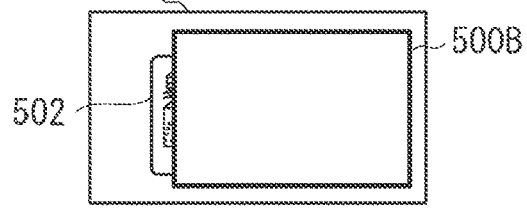
FIG. 5E1 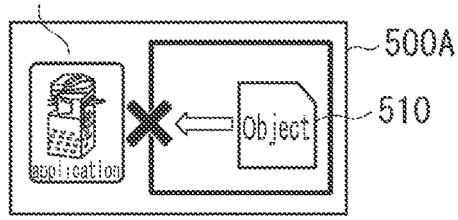
FIG. 5F1 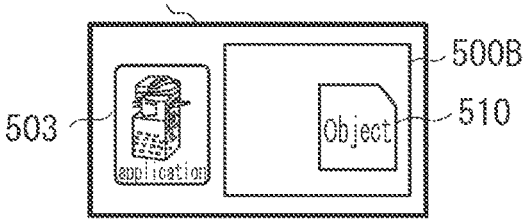
FIG. 5F2 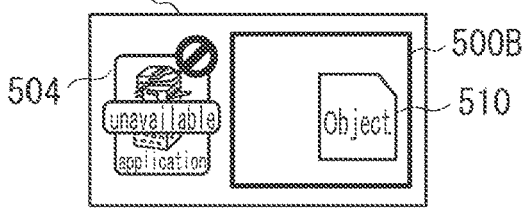

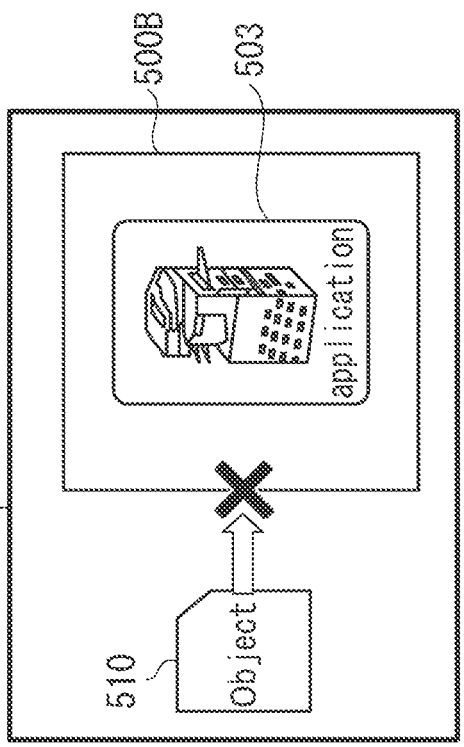
FIG. 9G1
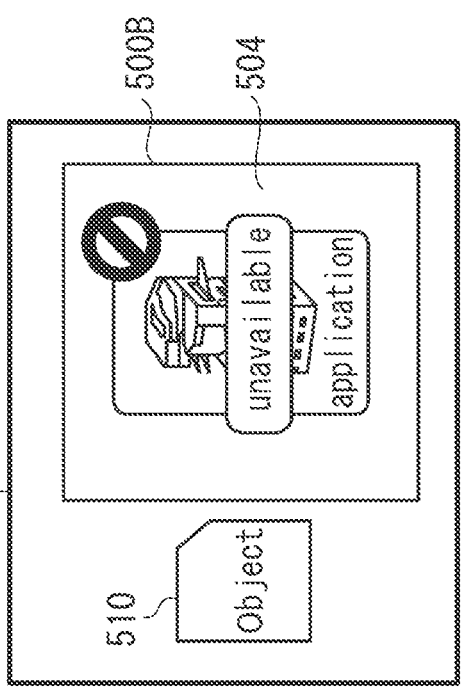
FIG. 9H1
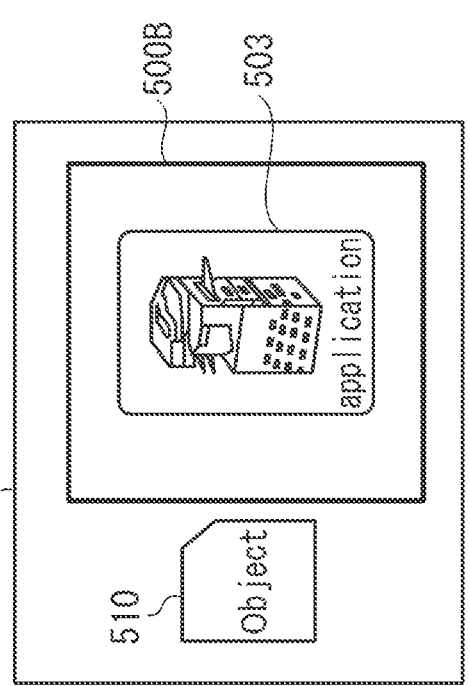
FIG. 9H2

INFORMATION PROCESSING APPARATUS FOR DISPLAYING A SOFTWARE SCREEN ON A FOREGROUND OF A DISPLAY BASED ON A SETTING

BACKGROUND OF THE INVENTION

Field of the Invention

The aspect of the embodiments relates to an information processing apparatus that changes display of software.

Description of the Related Art

There is known a remote desktop technology that enables operation of a graphical user interface (GUI) or a desktop environment of a computer connected from a computer on hand via a network. The remote desktop technology is widely used because of its convenience such that in a case where a computer in a business destination is used as a main computer in a remote environment, processing can be executed as if that computer is present on hand.

Japanese Unexamined Patent Application Publication (Translation of PCT Application) No. 2009-540428 discusses a technology that realizes drag-and-drop of an object between a local module and a remote module connected via remote desktop. According to Japanese Unexamined Patent Application Publication (Translation of PCT Application) No. 2009-540428, an object can be dragged and dropped between a local module and a remote module by detecting moving-in/out of a mouse icon from a window area in a remote desktop connection destination. Use of this technology enables an object to be dragged and dropped, via remote desktop, with respect to software activated in another computer.

Currently, generally-used remote desktop connection does not employ the technology discussed in Japanese Unexamined Patent Application Publication (Translation of PCT Application) No. 2009-540428. However, a user may drag and drop a file held in a computer as a connection destination (or a connection source) with respect to a software screen installed in a computer as a connection source (or a connection destination). This may occur in a case, for example, where a screen of software which has been installed in the computer as the connection source and has been set to be displayed on a foreground is displayed on a foreground of a window displaying a desktop screen of the computer as the connection destination. In this case, the user may misunderstand that the file held by the computer as the connection destination can be dragged and dropped. In a case where an icon on the desktop screen of the connection destination is present behind the software screen, the user's drag-and-drop operation is performed on the icon hidden behind the software screen. That is, processing that is not intended by the user may be executed as a result. For example, in a case where a trash icon is hidden behind a software drawing area displayed on the foreground, an object is dropped onto the trash icon of a remote desktop connection destination.

The aspect of the embodiments can prevent a file held by a computer as a connection destination (or a connection source) from being dragged and dropped with respect to a screen of software installed in a computer as a connection source (or a connecting destination).

SUMMARY OF THE INVENTION

An apparatus includes a setting unit configured to make a setting so that a screen of software which is being executed by the information processing apparatus is displayed on a foreground, and a confirming unit configured to confirm whether remote desktop connection is made, the remote desktop connection enabling a window, which is for displaying a desktop screen of another information processing apparatus, to be displayed on the display unit of the information processing apparatus. In a case where the confirming unit confirms that the remote desktop connection is made and in a case where the software screen is set to be displayed on the foreground, the setting unit cancels the setting for displaying the software screen on the foreground.

Further features of the disclosure will become apparent from the following description of exemplary embodiments with reference to the attached drawings.

BRIEF DESCRIPTION OF THE DRAWINGS

FIGS. 5A1 to 5F2 are diagrams illustrating a desktop screen according to a first exemplary embodiment.

FIGS. 9G1, 9H1 and 9H2 are diagrams illustrating a desktop screen according to a second exemplary embodiment.

DESCRIPTION OF THE EMBODIMENTS

Figure 1:
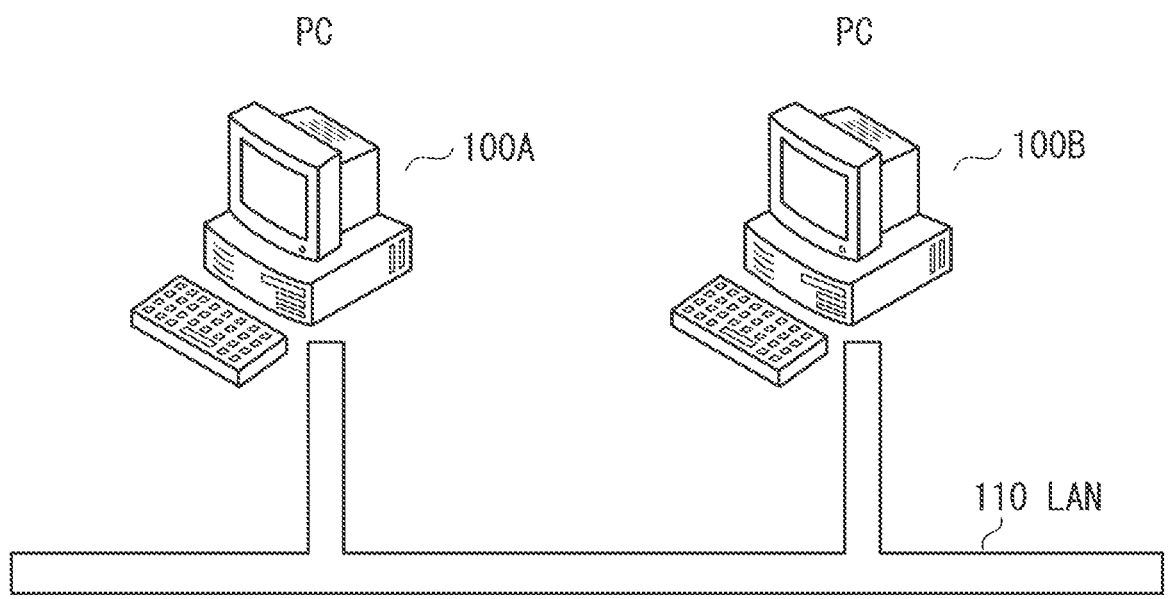
FIG. 1 is a diagram illustrating one example of a system configuration.

Elements of one embodiment may be implemented by hardware, firmware, software or any combination thereof. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Exemplary embodiments for carrying out the aspect of the embodiments will be described below with reference to the drawings.

[System Configuration]

A first exemplary embodiment will be described below. FIG. 1 is a diagram illustrating one example of a system configuration according to the first exemplary embodiment of the disclosure. The present exemplary embodiment refers to a system in which two or more information processing apparatuses are communicable with each other via a network.

In the present exemplary embodiment, the system includes computers 100A and 100B. The computer 100A is a connection source computer that establishes remote desktop connection with the computer 100B, and the computer 100B is a connection destination computer that is connected to the computer 100A through remote desktop. The remote desktop connection enables a window for displaying a desktop screen of an information processing apparatus to be displayed on a display unit of another information processing apparatus. Hereinafter, the computers 100A and 100B are referred to as a PC 100A and a PC 100B. A plurality of PCs 100B may be provided.

A local area network (LAN) 110 is connected to the computers 100A and 100B, and the computers 100A and 100B communicate with each other about information via the LAN 110. Any wired or wireless network such as Ethernet (registered trademark) or Wi-Fi (registered trademark) can be adopted as the network 110 for connecting the PC 100A and the PC 100B of the system according to the present exemplary embodiment.

[Hardware Configuration]

Figure 2:
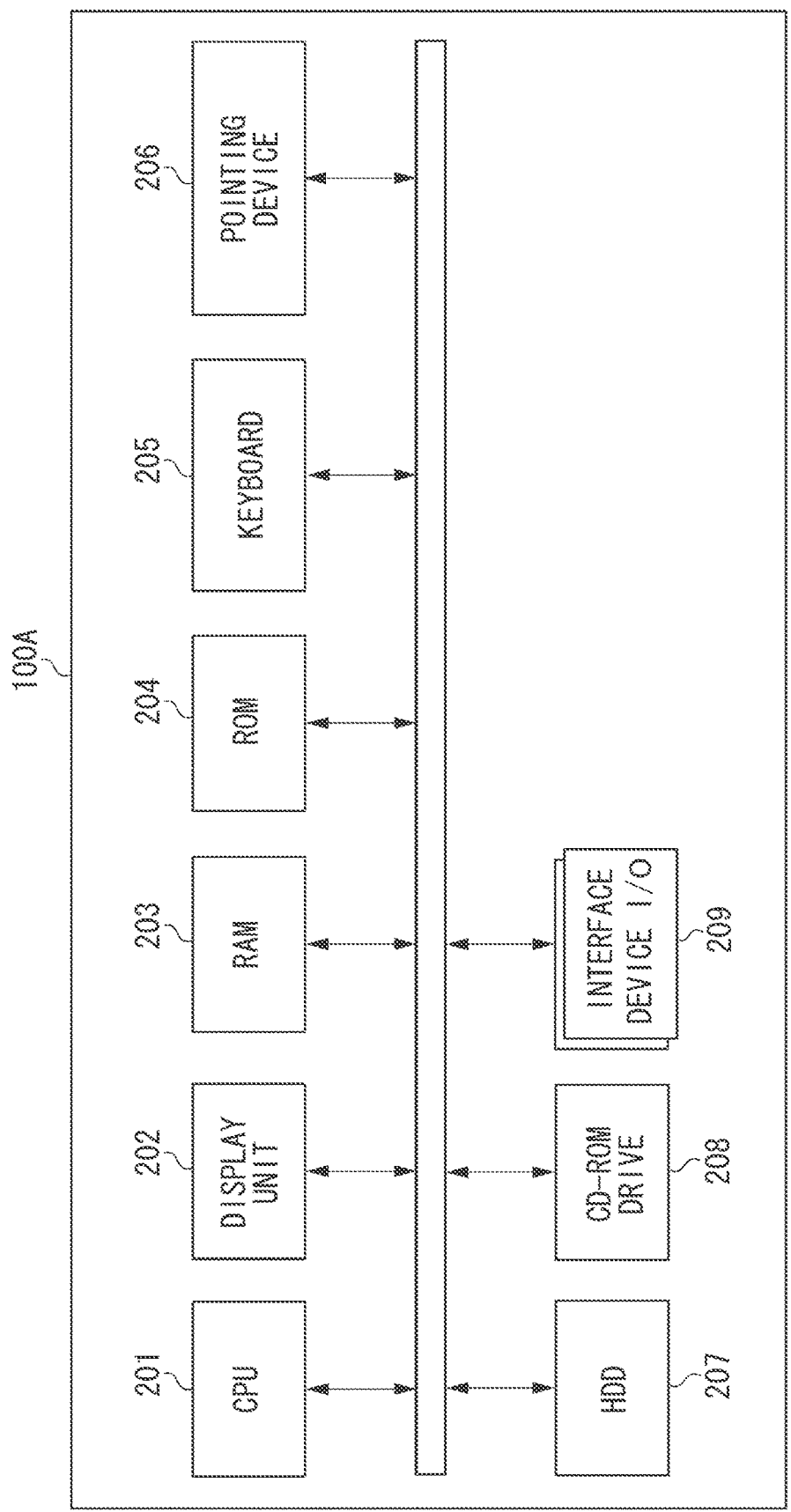
FIG. 2 is a diagram illustrating a hardware configuration.

FIG. 2 is a diagram illustrating one example of a hardware configuration of the PC 100A. The PC 100B also has a similar hardware configuration to that of the PC100A.

The PC 100A includes a keyboard 205 and a pointing device 206 as input devices for receiving inputs through a user operation.

The keyboard 205 is a device for inputting information such as a text and a figure into the PC 100A. The keyboard includes, for example, keys through which kana characters and alphabets are input, numerical keypads through which numbers are input, various function keys, a cursor key, and the other keys.

The pointing device 206 includes, for example, a mouse. In a case where a user operates the PC 100A using a graphical user interface (GUI), when the user clicks buttons or icons displayed on a display device using the mouse, predetermined information can be input. For example, the PC 100A displays an icon representing installed software on a display unit 202, and a central processing unit (CPU) 201 activates the software in accordance with user's clicking operation on the icon through the mouse. Further, the display unit 202 is provided to give visual feedback of output information to the user.

The display unit 202 displays various information on a screen of a cathode ray tube (CRT) display, a liquid crystal display, or a plasma display. The display unit 202 displays a result of an input through the keyboard or the mouse, a screen provided by software (for example, a user interface), and the like.

Further, the PC 100A includes the CPU 201 for controlling operations, a random-access memory (RAM) 203, a read-only memory (ROM) 204, and a hard disc drive (HDD) 207. On the PC 100A, the CPU 201 controls operations of software 300, a display unit 301, and a control unit 302 illustrated in FIG. 3 as operations specific to the present exemplary embodiment. The CPU 201 executes the software 300 of the PC 100A, and executes various computing, information processing, and control processing on the entire PC 100A in accordance with predetermined programs.

The RAM 203, the ROM 204, and the HDD 207 stores various programs and execution information in the present exemplary embodiment. Further, a compact disc read-only memory (CD-ROM) driver 208 that reads data recorded in a compact disc (CD) may be provided. In the RAM 203, the CPU 201 loads and executes an operating system (OS) and control programs including a control program for achieving the aspect of the embodiment. Further, the RAM 203 functions as various work areas and temporary storage areas to be used for executing the control programs. In the present exemplary embodiment, areas where the CPU 201 activates software and executes processing in the system are secured in the RAM 203. The ROM 204 is a storage device that stores data, parameters, various control programs for making various control over the CPU 201, and the like.

Figure 3:
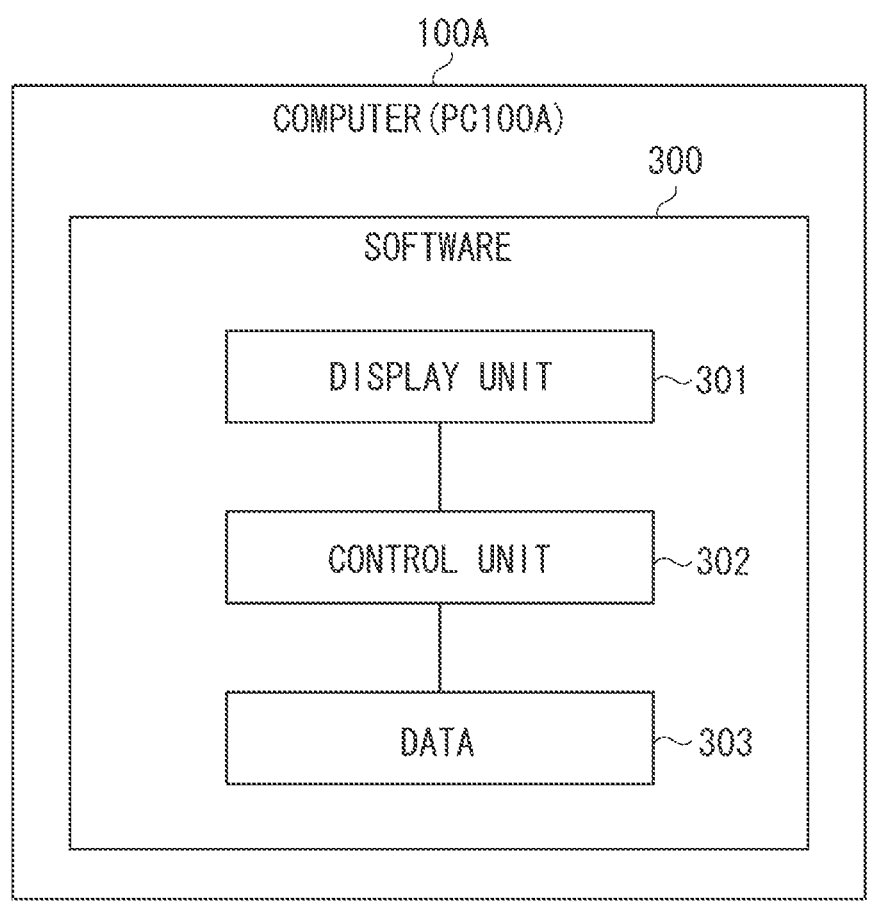
FIG. 3 is a diagram illustrating a software configuration.

The HDD 207 is one example of an auxiliary storage device that includes a readable and writable storage medium, and a drive device that reads and writes programs and data from and into the storage medium. In the present exemplary embodiment, the HDD 207 is a local disk having a hard disk. The storage medium in the HDD 207 may be a magneto-optical disk, a magnetic disk, a semiconductor memory, or the like. The software 300 illustrated in FIG. 3 is stored in the HDD 207. A communication program that controls an interface device input and output (I/O) 209 and maintains communication via the network is further stored in the HDD 207. The OS that is basic software for operating a memory management client or a file input/output management client is further stored in the HDD 207.

Further, the interface device I/O 209 that communicates with an external apparatus is provided, and the CPU 201 that executes a program is provided. Connection to a peripheral device may be wired connection or wireless connection. The interface device I/O 209 is connected to another terminal (web server, mail server or the like) via a network (for example, LAN or internet). In a case where the communication via the internet is established, for example, a protocol such as Transmission Control Protocol/Internet Protocol (TCP/IP) is used.

Processing described in the present exemplary embodiment is achieved in a manner that the CPU 201 loads the programs, which have been saved in the ROM 204 or the HDD 207, into the RAM 203 and executes the loaded programs.

[Software Configuration]

FIG. 3 is a diagram illustrating one example of a software configuration. FIG. 3 illustrates a processing unit that includes the PC 100A and relates to a display change of the software. In a second exemplary embodiment, the PC 100B also has the software configuration illustrated in FIG. 3.

Each of the configurations included in the PC 100A will be described. The PC 100A includes the software 300. The software 300 includes the display unit 301, the control unit 302, and data 303. In the example of FIG. 3, the software 300 has been installed in the PC 100A by an installer (not illustrated).

The software 300 is any software such as file management software, image editing software, editor software, word processor software, spreadsheet software, database software, and gadget. The software 300 according to the present exemplary embodiment includes a GUI that is capable of dropping an object being in a dragging state, and has a function for displaying a software screen on a foreground.

The display unit 301 constructs a user interface of the software 300. Further, the display unit 301 accepts various input operations from a user via the GUI.

The control unit 302 has a function for controlling entire processing relating to software control. For example, the control unit 302 detects an event to be output from the OS, and instructs, based on information about the event, the display unit 301 to change display of the software. The data 303 holds various settings of the software described below with reference to FIG. 4.

The processing described in the present exemplary embodiment is achieved in a manner that the CPU 201 loads the programs saved in the ROM 204 or the HDD 207 into the RAM 203 and executes the loaded programs.

[Setting Information of Software]

Figure 4:
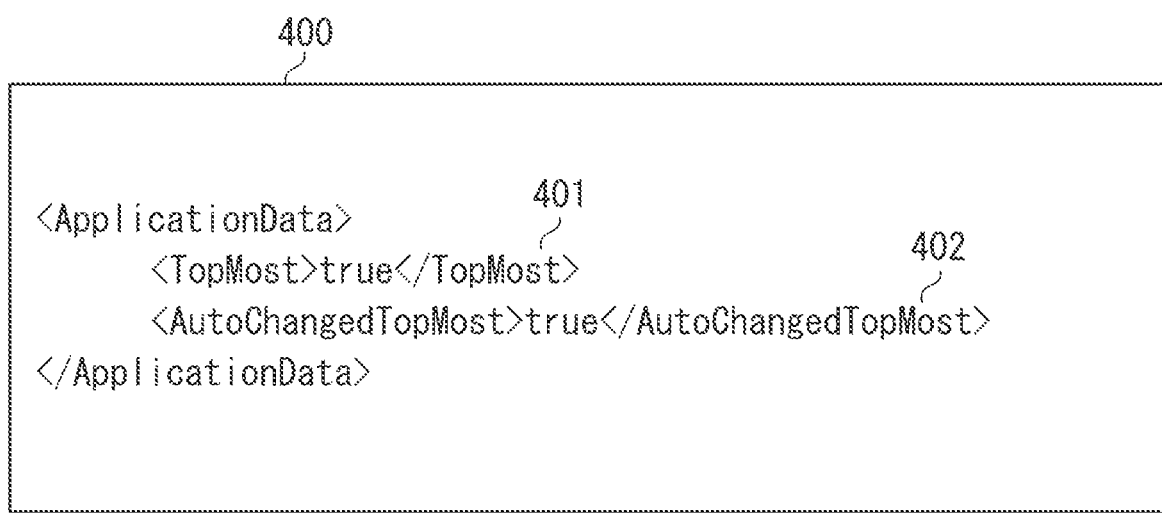
FIG. 4 is a diagram illustrating setting information of the software.

FIG. 4 illustrates one example of setting information of the software. Software setting information 400 illustrated in FIG. 4 holds a foreground setting value 401 relating to GUI (screen) of the software, and a change flag 402.

The foreground setting value 401 is a setting value for defining whether the GUI of the software 300 is displayed on the foreground. If the setting value is true, the GUI of the software 300 is displayed on the foreground. If the setting value is false, the GUI of the software 300 is not displayed on the foreground. For example, in a case where the setting value is true, even if another screen (another window or the like) is moved onto the GUI of the software 300, a screen to be displayed on the foreground is the GUI of the software 300. Further, the foreground setting value 401 can be changed by an arbitrary operation to be performed by a user. For example, the user right-clicks the GUI of the software 300 using the mouse, so that the foreground setting value 401 can be changed from a context menu or the like. A method for changing the foreground setting value 401 is not limited to the above operation.

The change flag 402 of the foreground setting is a value for defining whether the control unit 302 has changed the foreground setting value 401. A default value is false. If the control unit 302 once changes the foreground setting value 401, the change flag 402 indicates true, and then if the control unit 302 changes the foreground setting value 401 again, the change flag 402 indicates false.

For example, if the control unit 302 automatically changes the foreground setting value 401 from true to false through processing in a flowchart described below with reference to FIG. 6, the change flag 402 of the foreground setting indicates true.

[Desktop Screen in the First Exemplary Embodiment]

FIGS. 5A1 to 5F2 illustrate examples of a desktop screen of the PC 100A in a case of remote desktop connection between the PC 100A and the PC 100B. The three situations and solving methods for the situations in the present exemplary embodiment are illustrated in FIGS. 5A1 to 5F2. The first situation is illustrated in FIGS. 5 A1 and 5A2, and the solving method for the first situation is illustrated in FIGS. 5B1 and 5B2. The second situation is illustrated in FIG. 5C1, and the solving method for the second situation is illustrated in FIGS. 5D1 and 5D2. The third situation is illustrated in FIG. 5E1, and the solving method for the third situation is illustrated in FIGS. 5F1 and 5F2. These situation and solving methods will be described with reference to flowcharts (FIG. 6, FIG. 7, and FIG. 8), described below, according to the first exemplary embodiment.

Items illustrated in FIGS. 5A1 to 5F2 will be described. A screen 500A is a desktop screen of the PC 100A as a connection source. A window 500B is a remote desktop window indicating a desktop screen of the PC 100B as a connection destination. The window 500B includes an enlarging/shrinking function for a window area, such as a minimizing function, a maximizing size, and a size changing function. In FIG. 5A1, the window 500B is not maximized, but in FIG. 5A2, the window 500B is maximized. Similarly, in FIG. 5B1, the window 500B is not maximized, but in FIG. 5B2, the window 500B is maximized.

A software screen 501 is installed in the PC 100A as the connection source, and foreground display is set for the software screen 501.

A software screen 502 is installed in the PC 100A as the connection source, and the foreground display is not set (is canceled) for the software screen 502. At least a part of the software screen 502 is hidden by the window 500B.

A software screen 503 is installed in the PC 100A as the connection source, and does not indicate that a drag-and-drop operation is impossible.

A software screen 504 is installed in the PC 100A as the connection source, and indicates that the drag-and-drop operation is impossible. This state is indicated by, for example, graying out the software screen 504, making the software screen 504 transparent, giving a mark indicating that the drag-and-drop operation is impossible to the software screen 504, or displaying a text indicating that the drag-and-drop operation is impossible. In such a manner, a user can be notified about restriction on the software. A method for expressing that the software is restricted is not limited to the method in the present exemplary embodiment.

A file 510 is an object which is held in the PC 100B and is subject to the drag-and-drop operation. The file 510 is a file in the window indicated by 500B.

In FIGS. 5A1 to 5F2, an active screen or an active window on which a user is currently performing an operation is indicated by a thick line.

[Processing 1 of the Software 300 According to the First Exemplary Embodiment]

In some cases a software screen, which is set for display on the foreground, of the PC 100A as the connection source continues to be displayed on a window for displaying a desktop screen of the PC 100B as the connection destination. In this case, a user may accidentally try to drag and drop a file on the window onto the software screen.

FIGS. 5A1 and 5A2 illustrate a state that the software screen 501, which has been installed in the PC 100A as the connection source and has been set for display on the foreground display, is displayed overlapping with the window 500B indicating the desktop screen of the PC 100B as the connection destination. Even if the user tries to drag the file 510 and drop it onto the software screen 501, the dropping cannot be performed. This is because the software screen 501 cannot detect an event on the window 500B for displaying the desktop screen of the PC 100B. Even if the technology discussed in Japanese Unexamined Patent Application Publication (Translation of PCT Application) No. 2009-540428 is applied, a mouse icon is not moved outside the window 500B. For this reason, a condition for performing the drag-and-drop operation on an object between two computers is not satisfied, and thus a dropping event cannot be detected.

Further, in some cases, an icon of the desktop screen of the PC 100B may be present behind the software screen 501 that has been set to be displayed on the foreground. In such a case, although a user tries to drop the file 510 onto the software screen 501, another icon behind the software screen 501 may be dropped. For example, if the trash icon is present behind the software screen 501, the dropped file 510 is accidentally stored in the trash.

Herein, processing for changing display of the software screen for solving the above situation will be described.

Figure 6:
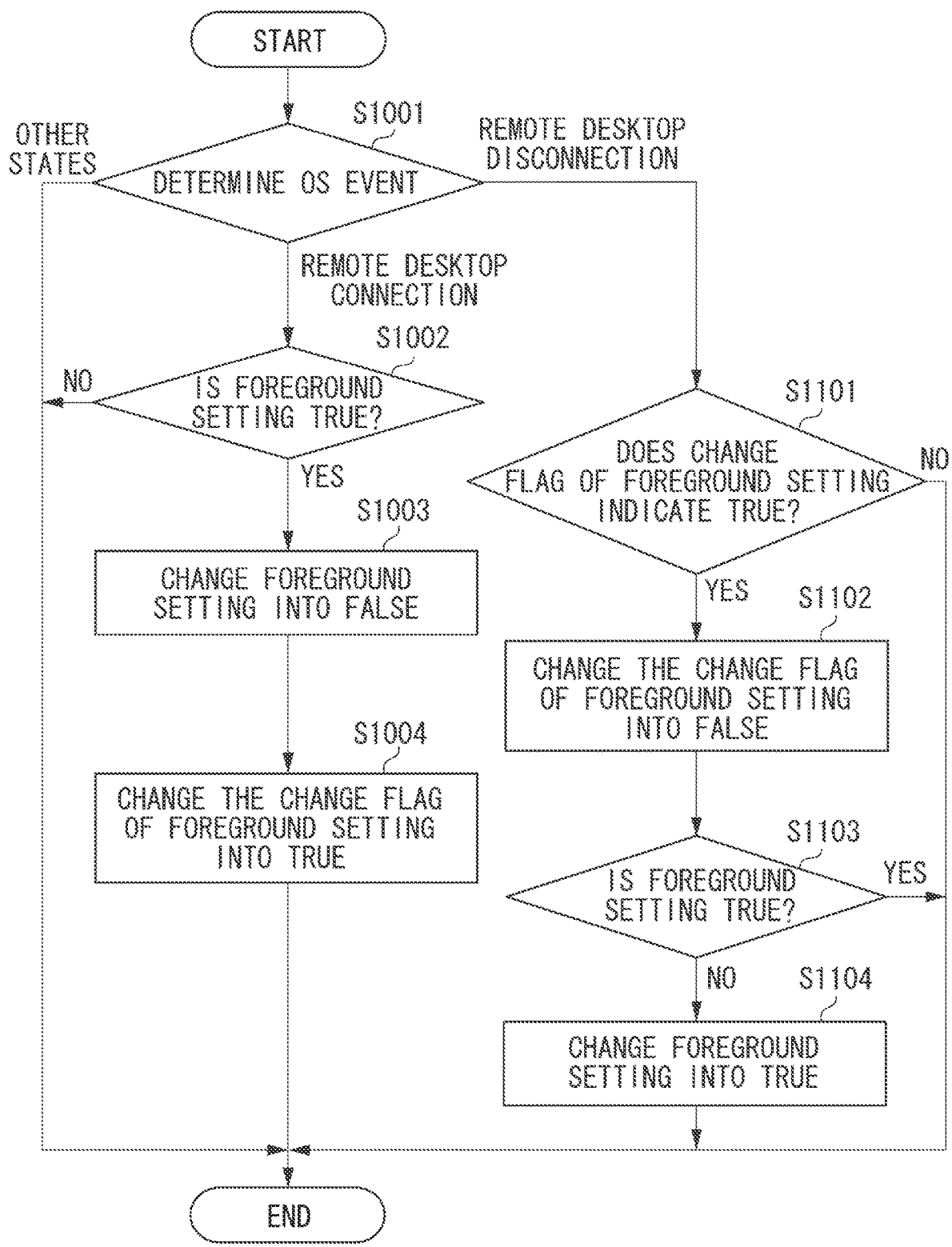
FIG. 6 is a flowchart illustrating a flow of processing to be executed by software according to the first exemplary embodiment.

FIG. 6 is a flowchart illustrating a flow of processing to be executed by the software 300. The processing to be executed by the software 300 operating on the PC 100A in FIG. 1 will be described as an example. This flowchart illustrates one example of the display change processing for the software screen 501 (502).

The control unit 302 detects an event to be output by the OS so that the processing in this flowchart starts. In step S1001, the control unit 302 determines a type of the detected OS event. If the OS event is remote desktop connection (REMOTE DESKTOP CONNECTION in step S1001), the processing proceeds to step S1002. If the OS event is remote desktop disconnection (REMOTE DESKTOP DISCONNECTION in step S1001), the processing proceeds to step S1101. In other cases (OTHER STATES in step S1001), the processing is ended.

If it is confirmed that the remote desktop connection has been made, in step S1002, the control unit 302 determines whether the foreground setting value 401 is true. If the setting value is true (Yes in step S1002), the processing proceeds to step S1003. If the setting value is false (No in step S1002), the processing is ended.

In step S1003, the control unit 302 changes the foreground setting value 401 to false. In accordance with the change in the foreground setting value 401 to false, the display unit 301 cancels the display of the software screen 501 on the foreground. That is, as illustrated in FIGS. 5B1 and 5B2, the software screen 501 is hidden behind the remote desktop window 500B, and a user cannot visually recognize it.

In step S1004 the control unit 302 changes the change flag 402, which indicates that the foreground setting value 401 has been changed, to true, and the processing is ended.

On the other hand, if the event determined in step S1001 is the remote desktop disconnection, the control unit 302 determines in step S1101 whether the change flag 402 of the foreground setting indicates true. If the change flag 402 indicates true (Yes in step S1101), the processing proceeds to step S1102. If the change flag 402 indicates false (No in step S1101), the processing is ended.

If it is confirmed that the remote desktop connection has not been established, in step S1102, the control unit 302 changes the change flag 402 of the foreground setting to false.

In step S1103, the control unit 302 determines whether the foreground setting value 401 is true. If the setting value is true (Yes in step S1103), the processing is ended. If the setting value is false (No in step S1103), the processing proceeds to step S1104.

In step S1104, the control unit 302 changes the foreground setting value 401 to true. In accordance with the change in the foreground setting value 401 to true, the display unit 301 displays the software screen 501 on the foreground. That is, the state is returned to the state same as before the remote desktop connection by making the setting of the foreground display to ON.

The processing for changing the display of the software screen in accordance with the remote desktop connection or disconnection has been described above. As a result, since a user cannot visually recognize the software screen in a drag-and-drop impossible state when the user operates the computer as the remote desktop connection destination, an unintended/erroneous operation can be prevented.

[Processing 2 of the Software 300 According to the First Exemplary Embodiment]

The desktop screen 500A may be operated without maximizing the window 500B on the remote desktop during the remote desktop connection in some cases. In a case where the processing 1 is applied, the software screen 501 is not displayed on the foreground during the remote desktop connection. For this reason, as illustrated in FIG. 5C1, the software screen 502 which is to be displayed on the foreground may be hidden behind another window. In a case where the software screen 501 is not displayed on the foreground and is hidden behind another window even though a user is operating the desktop screen 500A, operability when the user performs the drag-and-drop operation on a file with respect to the software screen 502 is deteriorated.

A method for changing display of the software screen to solve the above situation will be described herein.

Figure 7:
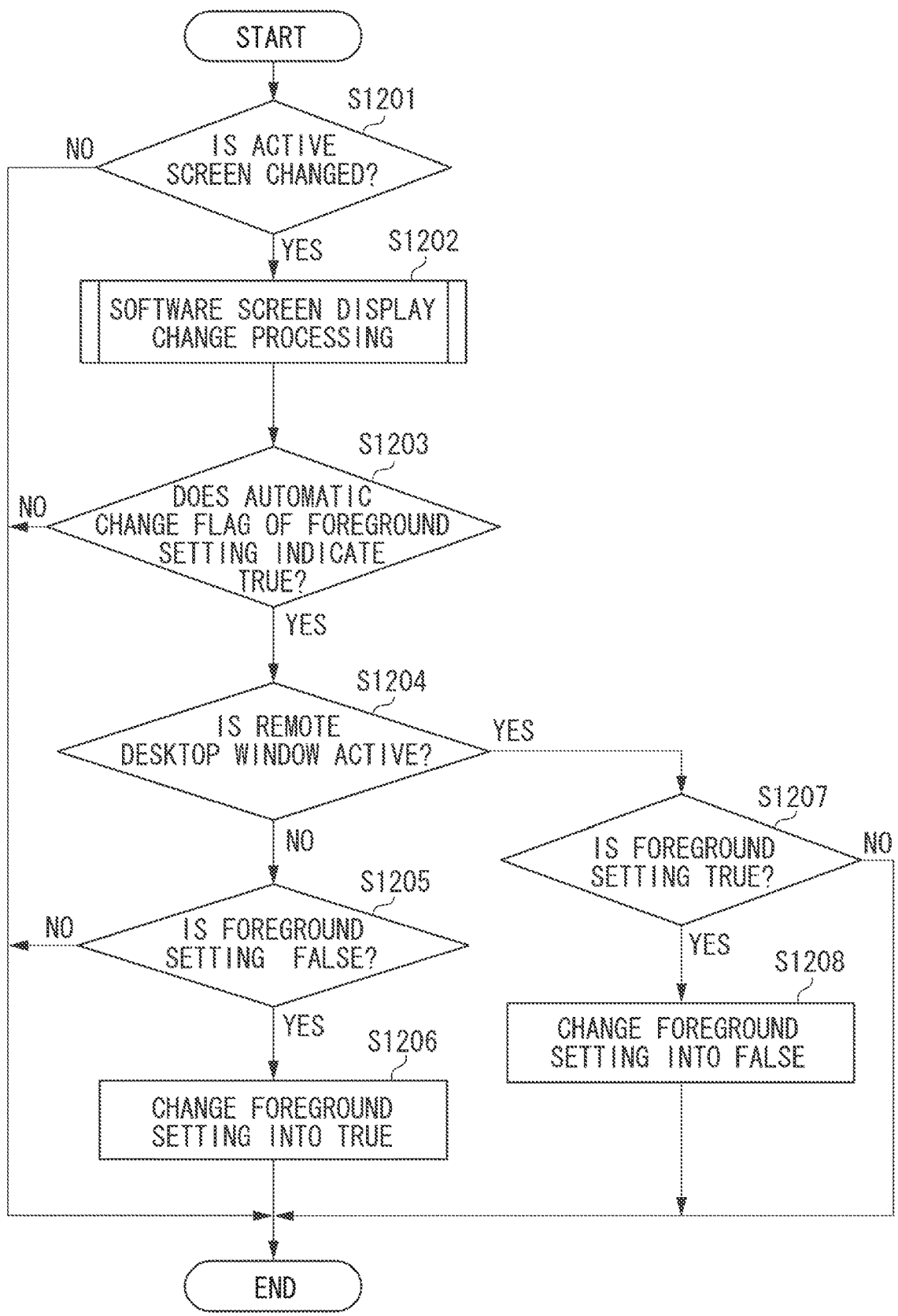
FIG. 7 is a flowchart illustrating a flow of processing to be executed by the software according to the first exemplary embodiment.

FIG. 7 is a flowchart illustrating a flow of the process to be executed by the software 300. The processing to be executed by the software 300 operating on the PC 100A in FIG. 1 will be described as an example. In this flow, a method for executing the processing for changing the display of the software screen 501 (502) will be described.

The control unit 302 detects an event to be output by the OS so that the processing in this flowchart starts. In step S1201, the control unit 302 determines whether an active screen is changed. If it is determined that the active screen is changed (Yes in step S1201), the processing proceeds to step S1202. If it is determined that the active screen is not changed (No in step S1201), the processing is ended.

Then, in step S1202, a subroutine relating to the change in software display is executed. Detailed processing in step S1202 will be described with reference to FIGS. 9G1 to 10 (described below).

In step S1203, the control unit 302 determines whether the change flag 402 for the foreground setting indicates true. If the change flag 402 indicates true (Yes in step S1203), the processing proceeds to step S1204. If the change flag 402 indicates false (No in step S1203), the processing is ended.

In step S1204, the control unit 302 determines whether the remote desktop window is active. If the remote desktop window is determined not to be active (No in step S1204), the processing proceeds to step S1205. If the remote desktop window is determined to be active (Yes in step S1204), the processing proceeds to step S1207.

In step S1205, the control unit 302 determines whether the foreground setting value 401 is false. If the setting value is determined to be false (Yes in step S1205), the processing proceeds to step S1206. If the setting value is determined to be true (No in step S1205), the processing is ended.

In step S1206, the control unit 302 changes the foreground setting value 401 to true. In accordance with the change in the foreground setting value 401 to true, as illustrated in FIG. 5D1, the display unit 301 displays the software screen 501 on the foreground, and the processing is ended.

In step S1207, the control unit 302 determines whether the foreground setting value 401 is true. If the foreground setting value 401 is determined to be true (Yes in step S1207), the processing proceeds to step S1208. If the foreground setting value 401 is determined to be false (No in step S1207), the processing is ended.

In step S1208, the control unit 302 changes the foreground setting value 401 to false. In accordance with the change in the foreground setting value 401 to false, as illustrated in FIG. 5D2, the display unit 301 cancels the display of the software screen 501 on the foreground, and the processing is ended.

The processing for changing display of the software screen in accordance with the state of the active screen during the remote desktop connection has been described above. Therefore, the software screen 501 is displayed on the foreground when it is usable, and is displayed behind the foreground when it is not usable. For this reason, a suitable software screen can be displayed in accordance with a state of the desktop screen.

[Processing 3 of Software According to the First Exemplary Embodiment]

The above description has been given as to the situation, which may occur even if the technology discussed in Japanese Unexamined Patent Application Publication (Translation of PCT Application) No. 2009-540428 is applied, and the solving means for the situation. However, as illustrated in FIG. 5E1, the technology discussed in Japanese Unexamined Patent Application Publication (Translation of PCT Application) No. 2009-540428 is not applied to the remote desktop that is installed as a standard function in a general OS. Most remote desktop users use the remote desktop installed as a standard function in the OS. However, in a case where the user moves the file 510 outside the window 500B while dragging it on that remote desktop, a cross mark is displayed on a position of a cursor. However, the user cannot determine from display on the screen that the file 510 cannot be dragged and dropped onto the software screen 501 before moving the file 510 outside the window 500B. For this reason, an erroneous operation may be performed.

Processing for changing display of a software screen in order to solve the above situation will be described.

Figure 8:
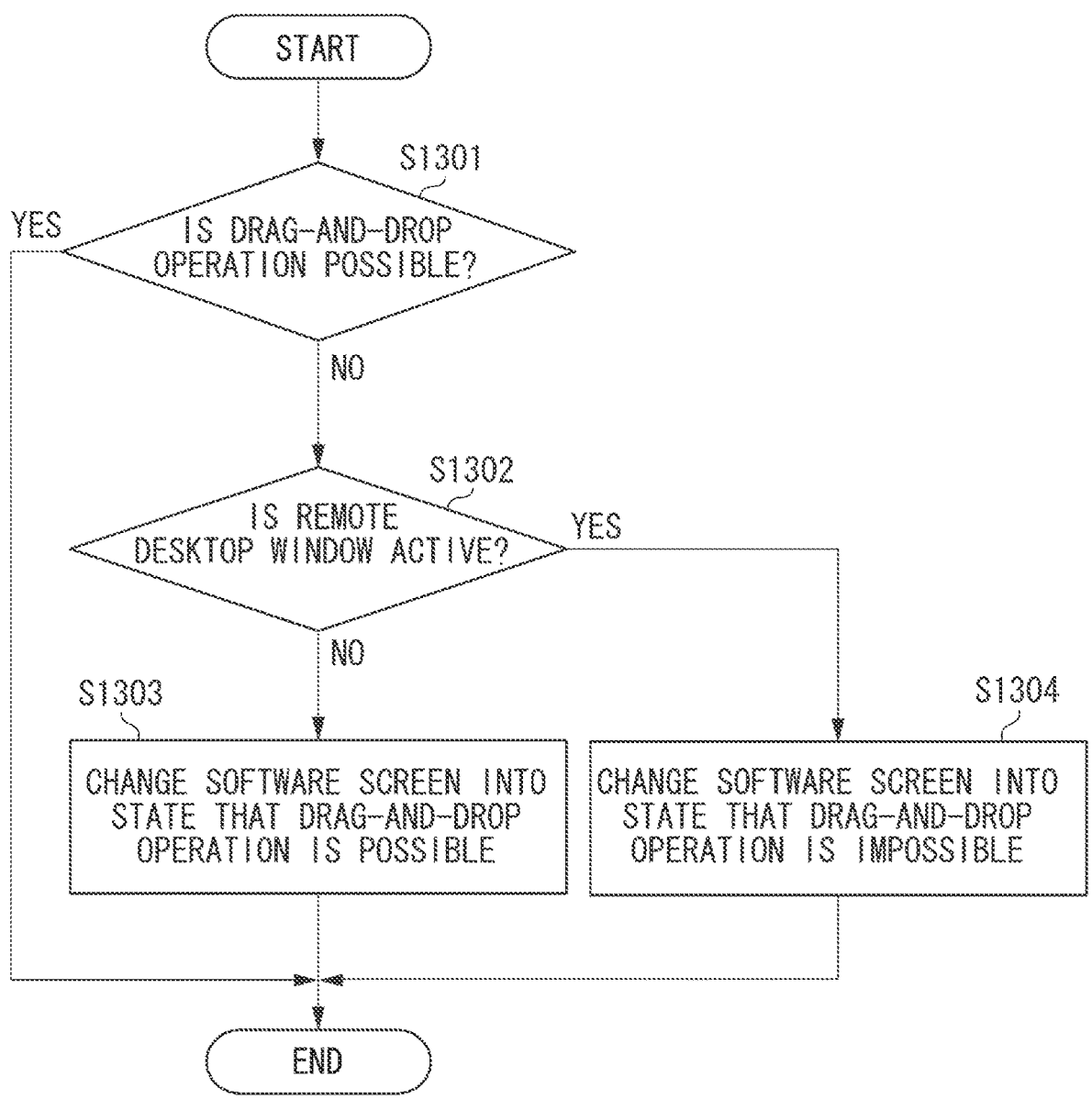
FIG. 8 is a flowchart illustrating a flow of processing to be executed by the software according to the first exemplary embodiment.

FIG. 8 is a flowchart illustrating processing to be executed by the software 300. The processing to be executed by the software 300 operating on the PC 100A in FIG. 1 will be described as an example. In this flow, a method for executing the processing for changing the display of the software screen 501 (503, 504) will be described.

The processing in this flowchart corresponds to the processing executed in step S1202 of FIG. 7.

In step S1301, the control unit 302 determines whether a file held in the PC 100B as the connection destination can be dragged and dropped onto the software screen 501 installed in the PC 100A as the connection source. If the control unit 302 determines that the drag-and-drop operation is possible (Yes in step S1301), the processing is ended. Specifically, this is the case where the above-described technology discussed in Japanese Unexamined Patent Application Publication (Translation of PCT Application) No. 2009-540428 is applied. If the control unit 302 determines that the operation is impossible (No in step S1301), the processing proceeds to step S1302. Specifically, this is the case of the remote desktop installed as a standard function in a general OS.

In step S1302, the control unit 302 determines whether the remote desktop window 500B is active. If the control unit 302 determines that the remote desktop window 500B is not active (No in step S1302), the processing proceeds to step S1303. If the control unit 302 determines that the remote desktop window 500B is active (Yes in step S1302), the processing proceeds to step S1304.

In step S1303, then, the display unit 301 changes, as illustrated in FIG. 5F1, the software screen 501 to display indicating that the drag-and-drop operation is possible.

In step S1304, the display unit 301 changes, as illustrated in FIG. 5F2, the software screen 501 to display indicating that the drag-and-drop operation is impossible.

In step S1302, the control unit 302 may determine whether a user has dragged (operated) the file 510, instead of whether the remote desktop window 500B is active. If the user has dragged the file (Yes in step S1302), the processing may proceed to step S1304. If the user has not dragged the file (No in step S1302), the processing may proceed to step S1303.

The processing for changing the display of the software screen in accordance with practicability of the drag-and-drop operation on software has been described above. As a result, in a case where the drag-and-droop operation cannot be performed on software, the software screen is changed to a screen indicating the state where the drag-and-droop operation is cannot be performed, and thus an erroneous operation by a user can be prevented.

A second exemplary embodiment will be described below. In the first exemplary embodiment, the processing for changing display of the software screen 503 installed in the PC 100B as the connection destination has been described. In the second exemplary embodiment, processing for changing display of the software screen 501 installed in the PC 100A as the connection source will be described.

[Desktop Screen in the Second Exemplary Embodiment]

FIGS. 9G1 to 9H2 illustrate examples of the desktop screen in a case where the PC 100A is connected to the PC 100B via the remote desktop. Herein, a situation in the second exemplary embodiment is presented and a method for solving the situation is described. The situation is illustrated in FIG. 9G1, and the solving method is illustrated in FIGS. 9H1 and 9H2. This solving method will be described with reference to a flowchart (FIG. 10) in the second exemplary embodiment.

[Processing of Software According to the Second Exemplary Embodiment]

In the first exemplary embodiment, the processing for changing the display of the software 300 installed in the PC 100A as the remote desktop connection source has been described.

However, in a method similar to that in the first exemplary embodiment, there is a situation in that the software 300 installed in the PC 100B as the remote desktop connection destination cannot be changed.

This situation will be specifically described. The remote desktop window 500B is one window displayed on the PC 100A (connection source). Since the PC 100A (connection source) can recognize the remote desktop window 500B (connection destination) as one window, a determination can be made on whether this window is in an active state. On the other hand, the PC 100B (connection destination) can determine whether the remote desktop connection is established, but cannot determine whether the remote desktop window 500B is active. Therefore, the PC 100B (connection destination) cannot detect that the remote desktop window 500B of its own is inactive on the desktop screen of the PC 100A. Therefore, as illustrated in FIG. 9G1, the PC 100B (connection destination) cannot change the software screen installed in the PC 100B (connection destination).

Therefore, in the second exemplary embodiment, the processing for changing the display of the software screen in software installed in the remote desktop connection destination will be described. In the present exemplary embodiment, the description about the system configuration and a user interface (UI) of an application similar to the first exemplary embodiment will be omitted.

[Processing of Software According to the Second Exemplary Embodiment]

Figure 10:
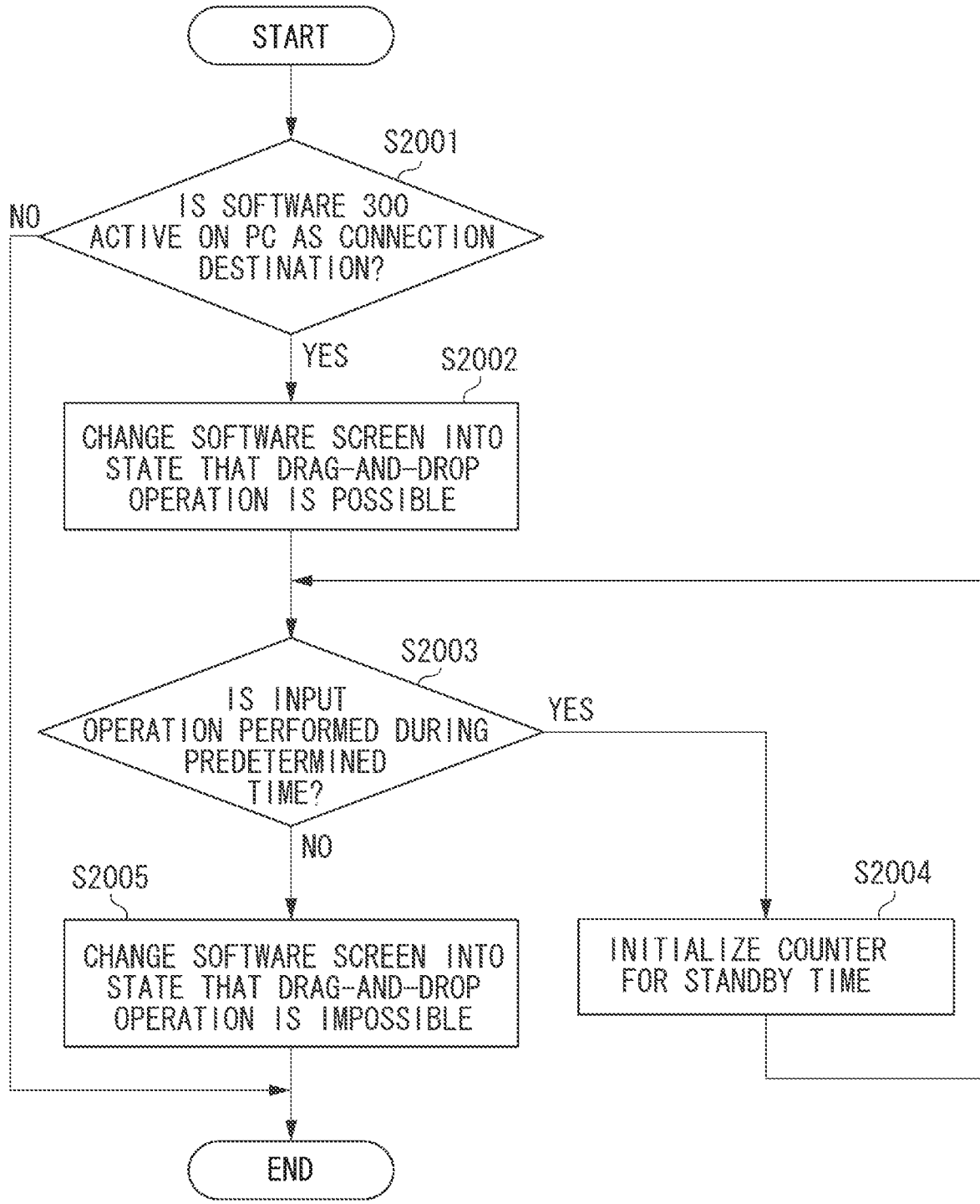
FIG. 10 is a flowchart illustrating a flow of processing to be executed by software according to the second exemplary embodiment.

FIG. 10 is a flowchart illustrating processing of the software 300. A flow of the processing will be described by taking, for example, the software 300 operating on the PC 100B as the connection destination. This flow illustrates a method for executing the processing for changing display of the software screen 503 (504).

When the control unit 302 detects an event to be output by the OS, the processing in this flowchart starts. In step S2001, the control unit 302 determines whether the software 300 is activated on the PC as the remote desktop connection destination. If it is determined that the software 300 is activated (Yes in step S2001), the processing proceeds to step S2002. If it is determined that the software 300 is not activated (the PC as an activation source is activated) (No in step S2001), the processing is ended.

In step S2002, the display unit 301 changes, as illustrated in FIG. 9H2, a software screen 503 to display indicating that the drag-and-drop operation is possible.

In step S2003, the control unit 302 determines whether an input operation such as a mouse operation or a keyboard operation is performed on the window 500B during a predetermined time. If it is determined that the input operation is performed during the predetermined time (Yes in step S2003), the processing proceeds to step S2004. If it is determined that the input operation is not performed during the predetermined time (No in step S2003), the processing proceeds to step S2005. For example, the predetermined time is 30 seconds. In this case, the control unit 302 makes a determination in accordance with presence/absence of the input operation during the 30 seconds. Therefore, for example, in a case where the control unit 302 again detects an input operation after 15 seconds from the previous input operation, the processing proceeds to step S2004. Counting of the predetermined time is managed by the RAM 203 as a counter that counts a standby time.

In step S2004, the control unit 302 initializes the counter for the standby time during which an input operation is accepted.

In step S2005, the display unit 301 changes, as illustrated in FIG. 9H1, the software screen 504 to display indicating that the drag-and-drop operation is impossible, and the processing is ended.

The processing for changing the display of the software screen in the software installed in the PC 100B as the remote desktop connection destination has been described above. With the processing, in a case where the drag-and-drop operation is impossible on software in the remote desktop connection destination, the software screen is changed to display indicating the state where the drag-and-drop operation is impossible. Therefore, an erroneous operation by a user can be prevented.

Other Embodiments

The disclosure includes apparatuses or systems and methods configured by suitably combining the above-described exemplary embodiments.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-122437, filed Jun. 22, 2017, which is hereby incorporated by reference herein in its entirety.

What is claimed is:

1. An apparatus in which a document management application is installed, the apparatus comprising:
 at least one processor, and
 at least one memory coupled to the at least one processor, the at least one memory having stored thereon instructions, which, when executed by the at least one processor, cause the at least one processor to act as:
 a display control unit configured to display a software screen implemented by the document management application;
 a setting unit configured to make a setting so that the software screen is displayed on a foreground on a display unit of the apparatus; and
 a determination unit configured to determine whether remote desktop connection is made, the remote desktop connection enabling a remote desktop screen for displaying a desktop screen of another apparatus, to be displayed on the display unit,
 wherein, in a case where the determination unit determines that the remote desktop connection is made, the display control unit displays the remote desktop screen in front of the software screen set by the setting unit to be displayed on the foreground, and
 wherein, in a case where the determination unit determines that the remote desktop connection is disconnected, the display control unit displays, on the foreground again, the software screen set by the setting unit to be displayed on the foreground.

2. The apparatus according to claim 1, wherein the cancellation of the setting causes at least a part of the software screen to be hidden behind the remote desktop screen.

3. The apparatus according to claim 1, wherein the at least one processor is caused to further act as a second determination unit configured to determine whether an operation is being performed on the remote desktop screen,
 wherein in a case where the operation is not being performed on the remote desktop screen, the setting unit makes a setting so that the software screen is displayed on the foreground, and in a case where the operation is being performed on the remote desktop screen, the setting unit cancels the setting for displaying the software screen on the foreground.

4. The apparatus according to claim 1, wherein in a case where the remote desktop connection is not made, the setting unit makes a setting so that the software screen is displayed on the foreground.

5. The apparatus according to claim 1, wherein, even in a case where the remote desktop connection is made in a situation where it is set by the setting unit to display the software screen on the foreground, the remote desktop screen enabled to be displayed by the remote desktop connection is displayed in front of the software screen,
 wherein, in a case where the software screen which is set by the setting unit to be displayed on the foreground is selected as a target of an operation, the software screen is displayed in front of the remote desktop screen, and
 wherein, in a case where the software screen which is not set by the setting to be displayed on the foreground is selected as the target of an operation, the software screen is displayed behind the remote desktop screen.

6. A method comprising:
 displaying a software screen implemented by a document management application;
 setting for displaying the software screen on a foreground on a display unit; and
 determining whether remote desktop connection is made, the remote desktop connection enabling a remote desktop screen for displaying a desktop screen of another apparatus, to be displayed on the display unit,
 wherein, in a case where the determining determines that the remote desktop connection is made, the displaying displays the remote desktop screen in front of the software screen set by the setting to be displayed on the foreground, and
 wherein, in a case where the determining determines that the remote desktop connection is disconnected, the displaying displays, on the foreground again, the software screen set by the setting to be displayed on the foreground.

7. The method according to claim 6, further comprising determining whether an operation is being performed on the remote desktop screen,
 wherein in a case where the operation is not being performed on the remote desktop screen, the setting is set so that the software screen is displayed on the foreground, and in a case where the operation is being performed on the remote desktop screen, the setting for displaying the software screen on the foreground is canceled.

8. The method according to claim 7, wherein the cancellation of the setting causes at least a part of the software screen to be hidden behind the remote desktop screen.

9. The method according to claim 6, wherein in a case where the remote desktop connection is not made, the setting is set so that the software screen is displayed on the foreground.

10. The method according to claim 6, further comprising dragging and dropping a file onto the software screen based on an instruction from a user.

11. A non-transitory computer readable medium storing a computer-executable program of instructions for causing a computer to perform a method comprising:
 displaying a software screen implemented by a document management application;
 setting for displaying a software screen on a foreground on a display unit; and
 determining whether remote desktop connection is made, the remote desktop connection enabling a remote desktop screen for displaying a desktop screen of another apparatus, to be displayed on the display unit,
 wherein, in a case where the determining determines that the remote desktop connection is made, the displaying displays the remote desktop screen in front of the software screen set by the setting to be displayed on the foreground, and
 wherein, in a case where the determining determines that the remote desktop connection is disconnected, the displaying displays, on the foreground again, the software screen set by the setting to be displayed on the foreground,
 wherein, even in a case where the remote desktop connection is performed in a situation where it is set by the setting to display the software screen on the foreground, the window enabled to be displayed by the remote desktop connection is displayed in front of the software screen,
 wherein in a case where the software screen which is set by the setting unit to be displayed on a foreground is selected as a target of an operation, the software screen is displayed in front of the window, and
 wherein in a case where the software screen which is not set by the setting to be displayed on a foreground is selected as the target of an operation, the software screen is displayed behind the window.

12. The non-transitory computer readable medium according to claim 11, further comprising determining whether an operation is being performed on the remote desktop screen,
   wherein in a case where the operation is not being performed on the remote desktop screen, the setting is set so that the software screen is displayed on the foreground, and in a case where the operation is being performed on the remote desktop screen, the setting for displaying the software screen on the foreground is canceled.

13. The non-transitory computer readable medium according to claim 12, wherein the cancellation of the setting causes at least a part of the software screen to be hidden behind the remote desktop screen.

14. The non-transitory computer readable medium according to claim 11, wherein in a case where the remote desktop connection is not made, the setting is set so that the software screen is displayed on the foreground.

15. The non-transitory computer readable medium according to claim 11, further comprising dragging and dropping a file onto the software screen based on an instruction from a user.

* * * * *